US007851413B2

(12) United States Patent
Anne et al.

(10) Patent No.: US 7,851,413 B2
(45) Date of Patent: Dec. 14, 2010

(54) METHOD FOR TRANSPORTING HYDRATES IN SUSPENSION IN PRODUCTION EFFLUENTS EMPOLYING A NON-POLLUTING ADDITIVE

(75) Inventors: Sinquin Anne, Bezons (FR); Christine Dalmazzone, Versailles (FR); Annie Audibert, Croissy sur Seine (FR); Vincent Pauchard, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 1333 days.

(21) Appl. No.: 11/298,941

(22) Filed: Dec. 12, 2005

(65) Prior Publication Data

US 2006/0151026 A1 Jul. 13, 2006

(30) Foreign Application Priority Data

Dec. 13, 2004 (FR) .................................. 04 13304

(51) Int. Cl.
*C09K 3/00* (2006.01)

(52) U.S. Cl. ........................... 507/90; 585/15; 585/950

(58) Field of Classification Search .................. 507/90; 585/15, 950

See application file for complete search history.

(56) References Cited

U.S. PATENT DOCUMENTS

| | | | | |
|---|---|---|---|---|
| 4,615,998 | A | 10/1986 | Le Quan et al. | |
| 5,244,878 | A * | 9/1993 | Sugier et al. | 507/90 |
| 5,292,979 | A | 3/1994 | Chauvin et al. | |
| 5,550,304 | A | 8/1996 | Chauvin et al. | |
| 5,958,844 | A * | 9/1999 | Sinquin et al. | 507/90 |
| 6,358,482 | B1 | 3/2002 | Chodorge et al. | |
| 6,492,430 | B1 * | 12/2002 | Hillion et al. | 516/15 |
| 6,686,510 | B2 | 2/2004 | Commereuc et al. | |
| 6,706,657 | B2 | 3/2004 | Commereuc et al. | |

FOREIGN PATENT DOCUMENTS

| | | |
|---|---|---|
| EP | 0646413 | 4/1995 |
| FR | 2552079 | 3/1985 |
| FR | 2669921 | 6/1992 |
| FR | 2755130 | 4/1998 |
| FR | 2802921 | 6/2001 |
| FR | 2804622 | 8/2001 |

* cited by examiner

*Primary Examiner*—Randy Gulakowski
*Assistant Examiner*—Alicia M Toscano
(74) *Attorney, Agent, or Firm*—Millen, White, Zelano & Branigan, P.C.

(57) ABSTRACT

In order to transport hydrates in suspension in a fluid comprising water, gas and a liquid hydrocarbon, at least one non-polluting composition consisting essentially of a mixture comprising at least one ester associated with a non-ionic co-surfactant of the polymerized (dimer and/or trimer) carboxylic acid type is incorporated into said fluid. The composition is generally introduced in a concentration of 0.1% to 5% by weight with respect to the liquid hydrocarbon.

19 Claims, No Drawings

METHOD FOR TRANSPORTING HYDRATES IN SUSPENSION IN PRODUCTION EFFLUENTS EMPOLYING A NON-POLLUTING ADDITIVE

BACKGROUND OF THE INVENTION

1. Field of the Invention

The invention relates to a process for transporting hydrates of natural gas, petroleum gas or other gases in suspension in a fluid comprising water, one of said gases and a liquid hydrocarbon.

More particularly, it relates to a process in which a composition is used which comprises at least one ester associated with a non-ionic surfactant of the polymerized (dimer and/or trimer) carboxylic acid type.

Gases which form hydrates may comprise at least one hydrocarbon selected from methane, ethane, ethylene, propane, propene, n-butane and isobutane, and possibly $H_2S$ and/or $CO_2$.

Said hydrates form when water is in the presence of gas either in the free state or in the dissolved state in a liquid phase such as a liquid hydrocarbon and when the temperature reached by the mixture, in particular water, gas and possibly liquid hydrocarbons, such as oil, drops below the thermodynamic hydrate stability temperature, said temperature being given for a known gas composition when the pressure is fixed.

Hydrate formation is notorious particularly in the gas and oil industry where hydrate formation conditions may occur. To reduce the cost of crude oil and gas production, both from the point of view of investment and from the exploitation point of view, one possible route, in particular for offshore production, is to reduce or do away with the treatments applied to crude oil or gas to be transported from the field to the coast and to leave all or some of the water in the fluid to be transported. Such offshore treatments are generally carried out on a platform located on the surface close to the field, so that the effluent, which is initially hot, can be treated before the thermodynamic hydrate stability conditions are reached due to cooling of the effluent by sea water.

However, as this occurs in practice when the thermodynamic conditions required to form hydrates are satisfied, hydrate agglomeration causes the transport lines to block by creating plugs which prevent the passage of crude oil or gas.

The formation of hydrate plugs may cause production to stop, and thus engender large financial losses. Further, restart of a facility, especially if it involves offshore production or transport, may be lengthy as it is difficult to decompose the hydrates formed. In fact, when the production of a submarine field for natural gas or oil and gas comprising water reaches the surface of the sea bed and is then transported on the sea bottom, the drop in temperature of the effluent means that the thermodynamic conditions for hydrate formation are satisfied; they agglomerate and block the transfer lines. The temperature on the sea bottom may, for example, by 3° C. or 4° C.

Conditions favorable to the formation of hydrates may also occur on land for lines which are above ground or are not deeply buried in the ground when, for example, the ambient air temperature is cold.

2. Description of Related Art

To overcome such disadvantages, the prior art has sought to use products which, when added to fluid, can act as inhibitors by reducing the thermodynamic hydrate stability temperature. They are alcohols such as methanol or glycols such as mono-, di- and tri-ethylene glycol. That solution is very expensive as the quantity of inhibitors to be added may reach 10% to 40% of the water content; further, such alcohols pollute the effluents as such inhibitors are difficult to recover.

Insulation of the transport lines has also been recommended to prevent the temperature of the transported fluid from reaching the hydrate formation temperature under the operating conditions. Again, such a technique is very expensive.

Further, a variety of non-ionic or anionic surfactants have been tested for their hydrate formation retarding ability in a fluid comprising a gas, in particular a hydrocarbon, and water. An example which may be cited is the article by Kuliev et al: "Surfactants Studied as Hydrate Formation Inhibitors", Gazovoe Delo N° 10, 1972, 17-19, reported in Chemical Abstracts 80, 1974, 98122r.

Further, the use of additives capable of modifying the hydrate formation mechanism has been described since, instead of rapidly agglomerating to form plugs, the hydrates formed disperse in the fluid without agglomerating and without obstructing the lines. In this regard, the Applicant's European patent application EP-A-0 323 774 may be cited, which describes the use of non-ionic amphiphilic compounds selected from esters of polyols and substituted or unsubstituted carboxylic acids, and compounds with an imide function; EP-A-0 323 775, also in the Applicant's name, describes the use of compounds belonging to the fatty acid diethanolamide or fatty acid derivative family; U.S. Pat. No. 4,856,593 describes the use of surfactants such as organic phosphonates, phosphate esters, phosphonic acids, their salts and their esters, inorganic polyphosphates and their esters, as well as polyacrylamides and polyacrylates; and EP-A-0 457 375, which describes the use of anionic surfactants such as alkylarylsulfonic acids and their alkali metal salts.

Amphiphilic compounds obtained by reacting at least one succinic derivative selected from the group formed by polyalkenyl succinic acids and anhydrides on at least one polyethylene glycol monoether have also been proposed to reduce the tendency of natural gas, petroleum gas or other gases to agglomerate (patent application EP-A-0 582 507).

BRIEF SUMMARY OF THE INVENTION

We have now discovered that, to transport hydrates in suspension in a fluid comprising water, gas and a liquid hydrocarbon, it is particularly advantageous to use as an additive one or more compositions comprising at least one ester, associated with a non-ionic co-surfactant of the polymerized (dimer and/or trimer) carboxylic acid type.

DETAILED DESCRIPTION OF THE INVENTION

Thus, the invention proposes a process for transporting hydrates in suspension in a fluid comprising at least water, a gas and a liquid hydrocarbon under conditions in which hydrates may form from water and gas, wherein an additive comprising at least one composition comprising at least one constituent A consisting of at least one ester formed between at least one linear or branched monocarboxylic acid and at least one linear or branched alcohol (monoalcohol or polyol), and at least one constituent B consisting of at least one polymerized fatty acid, is incorporated into said fluid.

The ester may be obtained by esterification, transesterification or interesterification.

More particularly, constituent A consists of at least one ester formed between at least one linear or branched monocarboxylic acid containing 8 to 24 carbon atoms, more particularly 14 to 18 carbon atoms, and at least one linear or branched alcohol containing 2 to 200 carbon atoms, more particularly 6 to 30 carbon atoms.

The acid may, for example, be a linear or branched, saturated or unsaturated or hydroxylated monocarboxylic acid having, for example, one of the following formula in which n=7:

$CH_3—(CH_2)_n—COOH$ (octanoic acid)

$CH_3—CH(CH_3)—(CH_2)_n—COOH$ (undecenoic acid)

$CH_3—CH_2—CH(CH_3)—(CH_2)_n—COOH$ (lauric acid)

$CH_3—(CH_2)_n—CH{=}CH—(CH_2)_n—COOH$ (oleic acid)

$CH_3—(CH_2)_{n-2}—CH(OH)—CH_2—CH{=}CH—(CH_2)_n—COOH$ (ricinoleic acid)

$CH_3—(CH_2)_{n-1}—(CH{=}CH—CH_2—CH{=}CH)—(CH_2)_n—COOH$ (arachidic and gadoleic acids)

$CH_3—(CH_2)_n—(CH{=}CH—CH{=}CH—CH{=}CH)—(CH_2)_n—COOH$ (erucic acid)

The alcohol may be:

a monoalcohol:

primary: R—CH2-OH;

secondary: (R-)2CH—OH;

tertiary: (R-)3C—OH;

in which R=$C_xH_y$, x=1 to 21 and y=2x+1;

a polyhydroxylated alcohol, in particular:

a diol, such as:

ethylene glycol and its polymers:

$HO—(CH_2—CH_2)—OH$;

$HOCH_2—CH_2—O(CH_2—CH_2—O)_m—CH_2—CH_2OH$ in which m=1 to 100;

propylene glycol: $CH_3—CHOH—CH_2—OH$;

neopentyl glycol: $HOCH_2—C(CH_3)(CH_3)—CH_2OH$ a triol, such as:

glycerol: $CH_2OH—CHOH—CH_2OH$;

trimethylolpropane: $CH_2OH—C(CH_2OH)(CH_2OH)—CH_2CH_3$;

a tetra-alcohol, such as:

pentaerythritol: $(CH_2OH)_4C$;

a hexol, such as:

sorbitol: CH2OH—CHOH—CHOH—CHOH—CHOH—CH2OH and its cyclic anhydride, sorbitan, or a sorbitan derivative;

a polyglycerol:

$CH_2OH—CHOH—CH_2—(O—CH_2—CHOH—CH_2)_p—O—CH_2—CHOH—CH_2OH$ in which p=1 to 8.

The polyols may be completely or partially esterified, depending on the fatty acid/alcohol stoichiometry employed during the esterifcation reaction, the nature of the fatty acids being as described above.

More particularly, the hydrophilic/lipophilic balance (HLB) of the ester is generally in the range 2 to 12, preferably in the range 3 to 8.

The preferred ester of the invention is an ester or a mixture of esters of sorbitol, sorbitan or its derivatives, more particularly the mixture designated as sorbitan monooleate.

Constituent B present in the mixture used in the invention is derived from dimerization of unsaturated monocarboxylic fatty acids containing 8 to 18 carbon atoms, for example. The reaction product provides a mixture of compounds containing 16 to 80 carbon atoms and constituted by a mixture of monomers, dimers, trimers and higher oligomers, more particularly dimers (16 to 36 carbon atoms).

The dimers may be represented by the following formula:

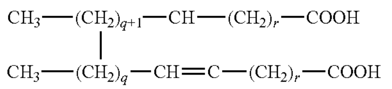

in which the sum q+r may take the value 4 to 14.

The trimers may have the formula:

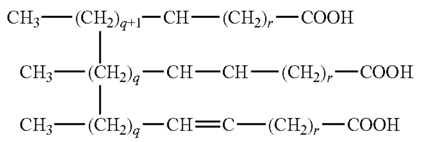

in which the sum q+r may take the value 4 to 14.

Constituent B is preferably a mixture of dimers of a monounsaturated fatty acid containing 16 carbon atoms (palmitic acid) and a monounsaturated fatty acid containing 18 carbon atoms (oleic acid).

Preferably, the mixture in the fluid of the invention will comprise 10% to 95% by weight, preferably 30% to 90% by weight and more preferably 50% to 80% by weight of constituent A. The co-surfactant (constituent B) then represents 5% to 90% by weight, preferably 10% to 70% by weight and more preferably 20% to 50% by weight of the mixture.

In their use as additives to reduce the tendency of hydrates to agglomerate, said compositions are added into the fluid to be treated in concentrations of 0.1% to 5% by weight in general, preferably 0.2% to 3% by weight with respect to the liquid hydrocarbon.

To test the efficacy of the products used in the process of the invention, the transport of hydrate forming fluids such as petroleum effluents was simulated and tests for the formation of hydrates from gas, condensate and water were carried out using the apparatus described below.

The apparatus comprises a 10 meter loop constituted by tubes with an internal diameter of 7.7 mm; a 2 liter reactor comprising a gas inlet and outlet, an intake and return for the mixture: condensate, water and additive initially introduced. The reactor allows the loop to be placed under pressure.

Tubes with a diameter analogous to those of the loop ensure fluid circulation from the loop to the reactor and conversely, via a gear pump placed between the two. A sapphire cell integrated into the circuit allows the circulating liquid and hydrates, if they are formed, to be viewed.

To determine the efficacy of the additives of the invention, the fluids (water, oil, additive) are introduced into the reactor; the facility is then heated under a pressure of 7 MPa. Homogenization of the liquids is ensured by circulating them in the loop and the reactor, then only in the loop. While monitoring the variations in pressure drop and flow rate, a rapid reduction in temperature from 17° C. to 4° C. (temperature below the hydrate formation temperature) is imposed then kept at this value.

The test duration may vary from a few minutes to several hours: a high performance additive can maintain circulation of the suspension of hydrates with a stable pressure drop and a stable flow rate.

The entire disclosure of all applications, patents and publications, cited above and below, and of corresponding French application 04/13304, filed Dec. 13, 2004, are hereby incorporated by reference.

The following examples illustrate the invention but should not be considered to be limiting.

EXAMPLE 1

Comparative

In this example, a fluid composed of 10% water and 90% condensate was employed.

The composition by weight of the condensate was:

for molecules containing less than 11 carbon atoms:

20% paraffins and isoparaffins, 48% of naphthenes, 10% of aromatics; and for molecules containing at least 11 carbon atoms:

22% of a mixture of paraffins, isoparaffins, naphthenes and aromatics.

The gas used comprised-98% of methane and 2% of ethane by volume. The experiment was carried out at a pressure of 7 MPa, kept constant by adding gas, with a liquid flow rate of 110 kg/hour. Under these conditions, formation of a plug was observed in the loop several minutes after the onset of hydrate formation (at a temperature of about 10.8° C.): the hydrates formed a block and fluid circulation became impossible.

EXAMPLE 2

In this example, the procedure of comparative Example 1 was followed using the same fluid, the same gas, at the same pressure and with the same flow rate, but 1% by weight with respect to the volume of condensate of a mixture in accordance with the invention containing 70% by weight of sorbitan monooleate and 30% by weight of C16-C18 fatty acid dimer was added to the circulating fluid. Under these conditions, an increase in the pressure drop during hydrate formation (at a temperature of about 10° C.) was observed, followed by its reduction and stabilization over more than 24 hours at a temperature of 4° C. A drop in temperature to 0° C. did not affect circulation of the suspension; the hydrates remained dispersed in the fluids.

EXAMPLE 3

Toxicity and Biodegradability of the Mixture of the Invention ("Water Hazard Classes" "WGK")

The classification "WGK" is given in accordance with the "Administrative Regulation on the Classification of Substances Hazardous to Waters into Water Hazard Classes" (Verwaltungsvorschrift wassergefahrdende Stoffe—VwVwS) dated $17^{th}$ May 1999. the classification "WGK" of a mixture can be determined, in accordance with Annex 4 of the new "VwVwS" regulations, by a calculation starting from the "WGK" classification of each constituent of a mixture or on the basis of the results of eco-toxicological tests carried out on the mixture.

Tests were carried out on constituents A and B of the mixture described in Example 2, used in accordance with the invention.

1) Acute oral toxicity in rat, OECD 401: the lethal dose, LD50, was 15900 mg/l;

2) WGK=1;

3) Acute toxicity OECD 203:

LC50 (24 h): no acute toxicity;

LC50 (48 h): no acute toxicity;

LC50 (72 h): no acute toxicity;

LC50 (96 h): no acute toxicity.

4) Biodegradation OECD 301D (28 d): easy biodegradability—83.3%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French application No. 04/13.304, filed Dec. 13, 2004 are incorporated by reference herein.

The invention claimed is:

1. A process for transporting hydrates in suspension in a fluid comprising water, a gas and a liquid hydrocarbon under conditions in which hydrates form from water and gas, wherein a mixture comprising the following is incorporated into said fluid in sufficient amounts to maintain the hydrates in suspension:

at least a constituent A selected from esters formed between at least one linear or branched monocarboxylic acid and at least one alcohol selected from linear or branched monoalcohols and polyols;

and a constituent B consisting of a mixture of dimers having 16 to 36 carbon atoms represented by the following formula:

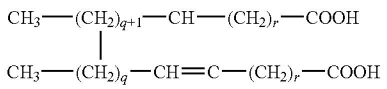

in which the sum q+r has the value 4 to 14.

2. A process according to claim 1, wherein, in said constituent A, said monocarboxylic acid contains 8 to 24 carbon atoms and said alcohol contains 2 to 200 carbon atoms.

3. A process according to claim 2, wherein said monocarboxylic acid contains 14 to 18 carbon atoms and said alcohol contains 6 to 30 carbon atoms.

4. A process according to claim 1, wherein the hydrophilic-lipophilic balance, noted HLB of said constituent A is in the range 2 to 12.

5. A process according to claim 1, wherein said constituent A comprises at least one ester of sorbitol, sorbitan or their derivatives.

6. A process according to claim 5, wherein said constituent A comprises at least one sorbitan monooleate.

7. A process according to claim 1, wherein said composition comprises 10% to 95% by weight of constituent A and 5% to 90% by weight of constituent B.

8. A process according to claim 7, wherein said composition comprises 30% to 90% by weight of constituent A and 10% to 70% by weight of constituent B.

9. A process according to claim 7, wherein said composition comprises 50% to 80% by weight of constituent A and 20% to 50% by weight of constituent B.

10. A process for transporting hydrates in suspension in a fluid comprising water, a gas and a liquid hydrocarbon under conditions in which hydrates form from water and gas, wherein a mixture comprising the following is incorporated into said fluid in sufficient amounts to maintain the hydrates in suspension:

at least a constituent A selected from esters formed between at least one linear or branched monocarboxylic acid and at least one alcohol selected from linear or branched monoalcohols and polyols;

and a free fatty acid constituent B comprising at least one dimer of mono-unsaturated fatty acids containing 16 or 18 carbon atoms, of the formula

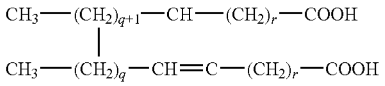

wherein the sum q +r has the value 4 or 5.

11. A process according to claim 1, wherein said composition is incorporated into said fluid in a concentration of 0.1% to 5% by weight with respect to the liquid hydrocarbon present.

12. A process according to claim 11, wherein said concentration is 0.2% to 3% by weight with respect to the liquid hydrocarbon present.

13. A process according to claim 1, wherein in said fluid, said gas comprises at least one hydrocarbon selected from methane, ethane, ethylene, propane, propene, n-butane, isobutene and possibly $H_2S$ and/or $CO_2$.

14. A process according to claim 1, wherein said fluid comprises natural gas.

15. A process according to claim 1, wherein said fluid comprises petroleum gas and at least one liquid hydrocarbon.

16. A process according to claim 6 wherein constituent B is a mixture of dimers of palmitic acid and oleic acid.

17. A process according to claim 9, wherein constituent A consists essentially of sorbitan oleate.

18. A process according to claim 1, for transporting hydrates in suspension in a fluid comprising water, a gas and a liquid hydrocarbon under conditions in which hydrates form from water and gas, wherein a mixture comprising the following is incorporated into said fluid in sufficient amounts to maintain the hydrates in suspension:

at least a constituent A selected from esters formed between at least one linear or branched monocarboxylic acid and at least one alcohol selected from linear or branched monoalcohols and polyols;

and a constituent B consisting of a mixture of dimers of a monounsaturated fatty acid containing 16 carbon atoms and dimers of a monounsaturated fatty acid containing 18 carbon atoms.

19. A process according to claim 1, wherein the mixture is non-polluting and biodegradable.

* * * * *